(12) United States Patent
Ballard et al.

(10) Patent No.: US 12,044,255 B2
(45) Date of Patent: Jul. 23, 2024

(54) ROTARY HYDRAULIC VALVE

(71) Applicant: Milwaukee Electric Tool Corporation, Brookfield, WI (US)

(72) Inventors: James G. Ballard, Waukesha, WI (US); Benjamin J. Tretow, Mequon, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/886,376

(22) Filed: Aug. 11, 2022

(65) Prior Publication Data

US 2023/0046222 A1 Feb. 16, 2023

Related U.S. Application Data

(60) Provisional application No. 63/232,105, filed on Aug. 11, 2021.

(51) Int. Cl.
*F15B 13/04* (2006.01)
*F16K 31/524* (2006.01)

(52) U.S. Cl.
CPC .... *F15B 13/0406* (2013.01); *F16K 31/52466* (2013.01)

(58) Field of Classification Search
CPC ........ F15B 13/04; F16K 31/524; B25F 5/005; B25B 27/146
See application file for complete search history.

(56) References Cited

U.S. PATENT DOCUMENTS

| 4,646,411 | A | 3/1987 | Hankins |
| 6,161,583 | A * | 12/2000 | Morris ............... F16K 11/0743 137/625.21 |
| 7,100,373 | B2 | 9/2006 | Oide |
| 8,262,063 | B2 | 9/2012 | Jacobs et al. |
| 9,441,775 | B2 | 9/2016 | Kimura et al. |
| 10,514,049 | B2 | 12/2019 | Kimura |
| 10,723,008 | B2 | 7/2020 | Kimura |
| 10,865,814 | B2 | 12/2020 | Kimura |
| 2016/0363510 | A1* | 12/2016 | Kanack .............. B25B 23/1456 |
| 2020/0094332 | A1 | 3/2020 | Kimura |
| 2020/0238487 | A1 | 7/2020 | Kanack et al. |

FOREIGN PATENT DOCUMENTS

| CN | 204851835 U | 12/2015 |
| CN | 107755797 A | 3/2018 |
| CN | 112060001 A | 12/2020 |
| WO | 2015/061425 A1 | 4/2015 |

* cited by examiner

*Primary Examiner* — Kenneth Bomberg
*Assistant Examiner* — Daniel S Collins
(74) *Attorney, Agent, or Firm* — Quarles & Brady LLP

(57) ABSTRACT

A hydraulic tool can include a hydraulic cylinder, a piston within the hydraulic cylinder, and a rotary valve. The piston can be configured to move between a retracted position and an extended position. The piston can include a piston ram and a piston rod that define a ram side and a rod side inside the hydraulic cylinder. The rotary valve can be moved between a first position and a second position. The first position can be configured to direct flow at a first variable speed and a first variable force to the ram side of the hydraulic cylinder and the second position can be configured to direct flow at a second variable speed and a second variable force to the rod side of the hydraulic cylinder.

15 Claims, 4 Drawing Sheets

ROTARY HYDRAULIC VALVE

RELATED APPLICATIONS

This application claims priority to U.S. Patent Application No. 63/232,105 filed Aug. 11, 2021, and entitled, "Rotary Hydraulic Valve," which is hereby incorporated by reference in its entirety.

BACKGROUND

Crimpers and cutters often include a crimping head with opposed jaws that include certain crimping and cutting features, depending on the particular configuration of the tool. Some crimpers and cutters are hydraulic power tools that include a piston that can exert force on the crimping or cutting head, which may be used for closing the jaws to perform crimp, compression, or cutting work at a targeted location.

SUMMARY

Embodiments of the invention provide systems, tools, hydraulic circuits, and methods associated with a two-position four-way valve.

Some embodiments of the invention provide a hydraulic tool including a hydraulic cylinder, a piston within the hydraulic cylinder, and a rotary valve. The piston can be configured to move between a retracted position and an extended position. The piston can include a piston ram and a piston rod that define a ram side and a rod side inside the hydraulic cylinder. The rotary valve can be moved between a first position and a second position. The first position can be configured to direct flow at a first variable speed and a first variable force to the ram side of the hydraulic cylinder and the second position can be configured to direct flow at a second variable speed and a second variable force to the rod side of the hydraulic cylinder.

Some embodiments of the invention provide a rotary shear seal valve. The rotary shear seal valve can include a valve body, a first pair of teeth, a second pair of teeth, and at least one shear seal disc. The first pair of teeth can extend radially from the valve body in a first angular direction and the second pair of teeth can extend radially from the valve body in a second angular direction.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
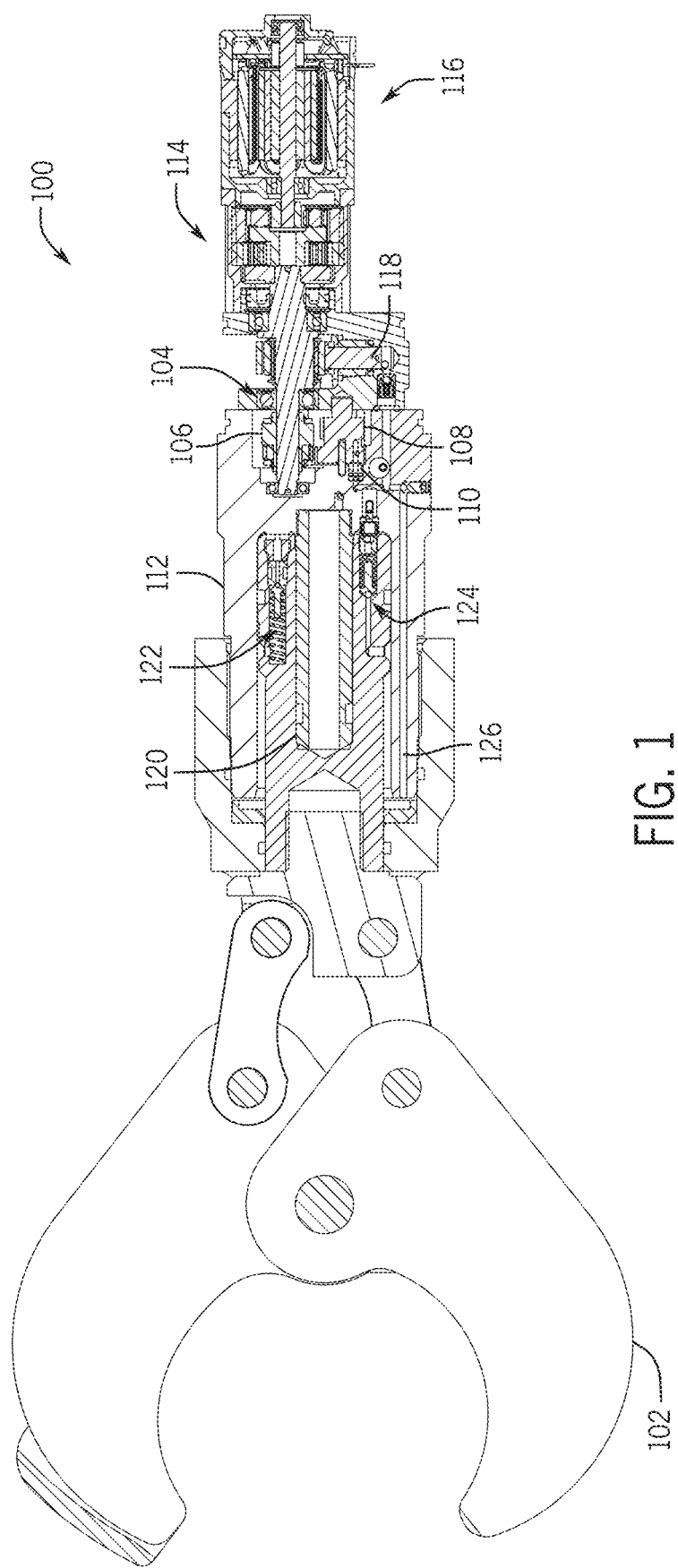
FIG. 1 is a cross-sectional side view of a hydraulic tool including a rotary valve according to an embodiment of the invention.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As briefly described above, certain hydraulic tools can be used to perform cuts or crimps on a work piece, such as a cable, for example. Generally, hydraulic tools include a cylinder and piston configuration, where the piston is configured to extend and retract within the cylinder, and thus, move jaws, or any other implement coupled to the piston to perform a task (crimping, cutting, etc.). In some conventional hydraulic crimpers and cutters, the hydraulic circuit can include a two-position two-way valve. In a two-position two-way valve, fluid can be directed to extend the piston, which corresponds to a first position. In a second position, a spring on the ram side of the piston can be used to retract the piston while the fluid is drained back to the fluid reservoir.

Some embodiments of the invention provide a two-position four-way valve for a hydraulic tool that allows for a piston within the hydraulic tool to be advanced and retracted under hydraulic power. For example, in a first valve position, the hydraulic fluid can be directed to extend the piston while returning the fluid from the rod side of the ram back to the fluid reservoir. Furthermore, in a second valve position, fluid is directed to the rod side of the ram to retract the piston while allowing fluid from the ram side to return to the fluid reservoir. Embodiments of the invention provide systems and methods of variable speed and force ram extension and retraction of a piston of a hydraulic tool, such as a hydraulic cutting or crimping tool, for example, via a rotary shear seal valve configured as a two-position, four-way valve.

Additionally, embodiments of the invention provide a four-way shear seal valve for a hydraulic tool. In general, the four-way shear seal valve can eliminate the need for a return spring that some conventional two-way valve designs require. A rotary system of the four-way shear seal valve can include a sprocket assembly that can interact with the four-way shear seal valve to change the direction of the valve based on a direction of a motor of the hydraulic tool is rotating. Embodiments of the invention can provide benefits over conventional valves and hydraulic system, such as, for example, limiting or eliminating blade jamming, providing high cycle life, and ensuring that blades and/or jaws are fully retracted after an operation.

FIG. 1 illustrates a hydraulic tool 100, for example, configured as a cutter having a cutting head 102. In other embodiments, the hydraulic tool 100 can include additional or alternative crimping or cutting features near the cutting head 102. For example, in some embodiments, the hydraulic tool 100 can be configured as a crimper. The hydraulic tool 100 includes a rotary drive system 104 having a sprocket 106 to drive a rotary valve 108. In the illustrated embodiment, the rotary valve 108 is configured as a four-way rotary shear seal valve and includes a shear disc 110.

The rotary drive system 104 is at least partially housed by a load cylinder 112 proximate to a gear case 114 of a motor 116. In use, a high pressure piston pump 118 can supply hydraulic fluid through the hydraulic circuit of the hydraulic tool 100 to control the cutting head 102. Housed within the load cylinder 112, the hydraulic tool 100 also includes a rapid advance inner cylinder 120, a high pressure relief valve 122, a low pressure relief valve 124, and a low pressure port 126 to the rotary valve 108.

Figure 2:
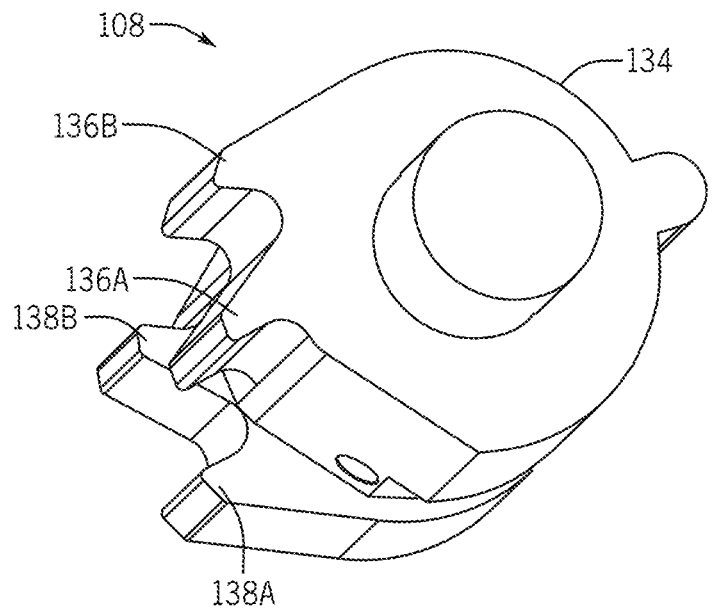
FIG. 2 is an isometric view of the rotary valve of FIG. 1.

FIG. 2 illustrates the rotary valve 108 of the hydraulic tool 100. As briefly described above, the rotary valve 108 is configured as a rotary shear seal valve and defines a valve body 134. The valve body 134 includes a first pair of teeth 136A, 136B and a second pair of teeth 138A, 138B. In general, the double tooth structure is configured to provide elevated angular rotation. In other words, the double tooth structure may provide increased angular rotation capabilities compared to rotary valves used in a two-position, two-way configuration having only singular teeth (e.g., not in a pair at the same axial position).

As illustrated in FIG. 2, the first pair of teeth 136A, 136B extend radially from the valve body 134 at a first angle relative to the valve body 134. Correspondingly, the second pair of teeth 138A, 138B extend radially from the valve body 134 at a second angle relative to the valve body 134. In general, the first pair of teeth 136A, 136B are angled from the valve body 134 in the opposite direction of the second pair of teeth 138A, 138B. As a result, the rotary valve 108 can be rotated in a first direction that corresponds to hydraulic fluid working to extend the piston and in an opposite second direction that corresponds to the hydraulic fluid working to retract the piston.

Figure 3:
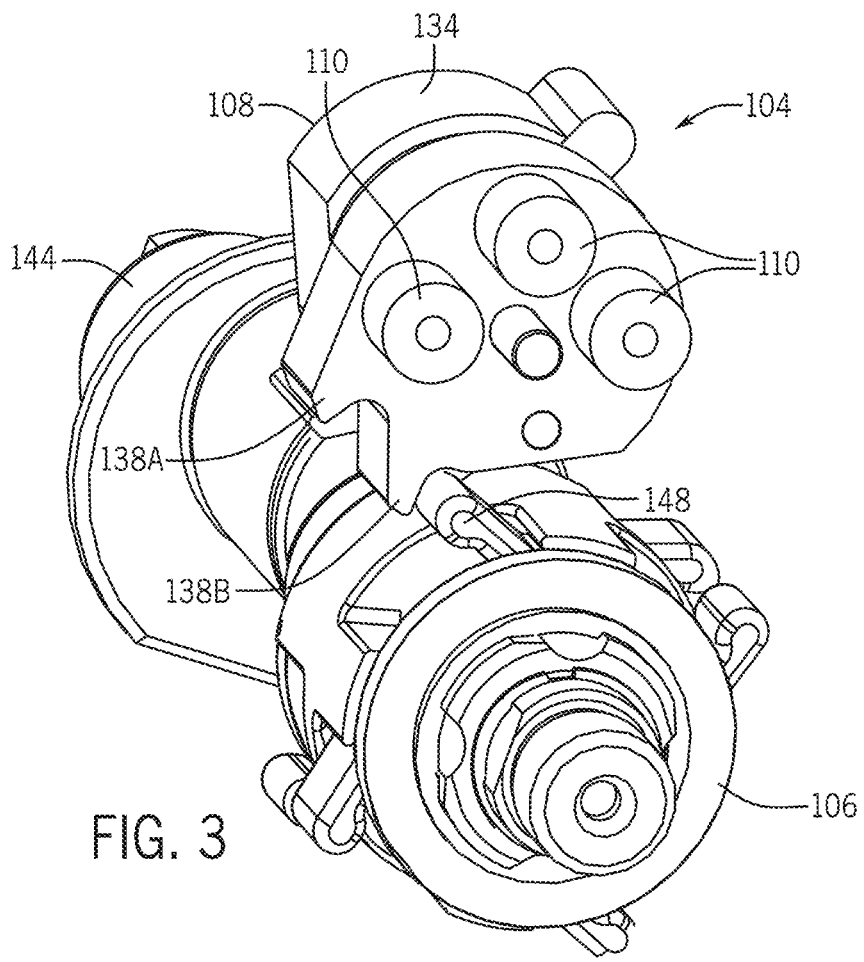
FIG. 3 is an isometric view of a rotary drive system including the rotary valve of the hydraulic tool of FIG. 1.
Figure 4:
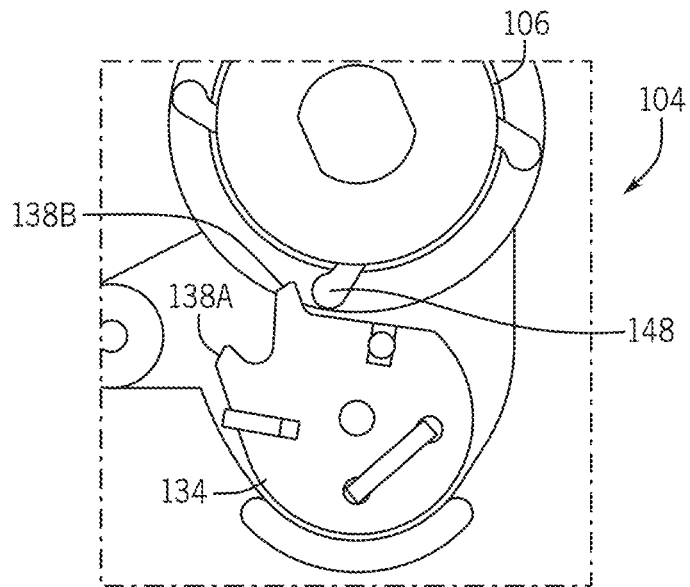
FIG. 4 is a side view of the rotary drive system of FIG. 3.

FIGS. 3 and 4 illustrate the rotary drive system 104 of the hydraulic tool 100. The rotary drive system 104 includes the sprocket 106 (e.g., a drive sprocket), configured as a sprocket assembly, located on a pump cam shaft 144. The sprocket 106 is configured to interact with the rotary valve 108 to change the direction of the rotary valve 108 based on the rotation direction the motor 116, and thus, the cam shaft 144. As further illustrated in FIG. 3, the rotary valve 108 includes three shear seal discs 110 at one end of the valve body 134. The shear seal discs 110 can provide a high valve cycle lift, tight sealing, and positive load control.

Also shown in FIGS. 2-4, each of the pairs of teeth 136A, 136B, 138A, 138B are configured as drive teeth. The drive teeth are configured to interact with a pawl 148 (of a plurality of pawls) of the sprocket 106 to rotate the rotary valve 108 between first and second positions. In use, having a pair of teeth in the same axial position allows for a first pawl to engage a first tooth, and subsequently a second pawl to engage a second tooth to continue rotating the rotary valve 108 in one direction. Alternatively, a first pawl can engage a first tooth and subsequently, the first pawl can engage the second tooth to continue rotating the valve 108. In this regard, the pairs of teeth configurations (e.g., [136A, 136B] and [138A, 138B]) increase the angular rotation ability of the valve 108 (i.e., compared to a single tooth configuration) so that rotating the drive sprocket 106 sufficiently rotates rotary valve. The added angular rotation ability of the valve 108 can help ensure a tight seal and deliberate control of the valve 108. The pair of teeth can also reduce slip risk and add a safety backstop if a pawl slips off a tooth.

Figures 5A, 5B:
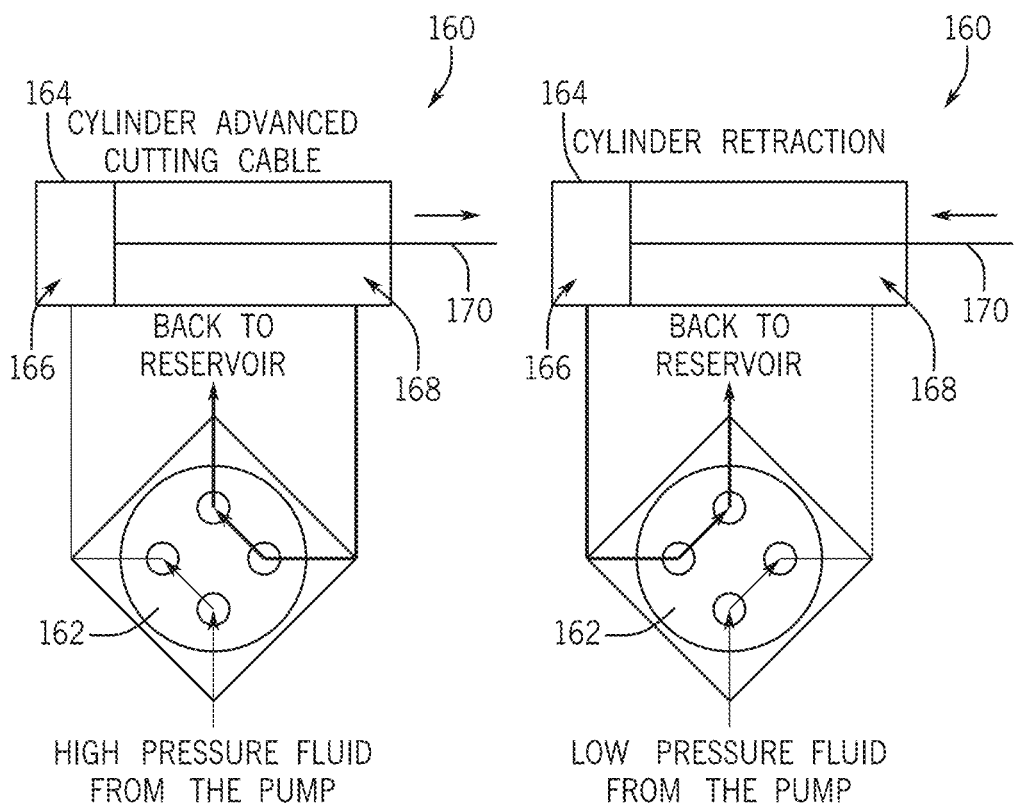
FIG. 5A is a schematic illustration of a rotary valve in a first position to advance a piston of a hydraulic tool according to an embodiment of the invention.
FIG. 5B is a schematic illustration of the rotary valve of FIG. 5A in a second position to retract the piston.

FIGS. 5A and 5B illustrate a schematic system 160 including a schematic representation of a rotary valve 162, such as the rotary valve 108. The rotary valve 162 is configured as a two-position, four-way valve, similar to the rotary valve 108 of the hydraulic tool 100. The schematic system 160 also includes a piston-cylinder 164 having a ram side 166 and a rod side 168 in fluid communication with hydraulic fluid. FIG. 5A illustrates the rotary valve 162 in a first position where fluid is directed to the ram side 166 of the piston-cylinder 164 from a high pressure fluid reservoir to extend the rod 170. The hydraulic fluid that is directed to the ram side 166 is high pressure fluid from the pump. Additionally, in the first position, fluid is directed from the rod side 168 back to the fluid reservoir.

FIG. 5B illustrates the rotary valve 162 in a second position. In the second position, fluid is directed to the rod side 168 of the piston-cylinder 164 to retract the rod 170. The hydraulic fluid that is directed to the rod side 168 is low pressure fluid from the pump. Additionally, in the second position, fluid is directed from the ram side 166 back to the fluid reservoir. As briefly discussed above, embodiments of the invention provide powered extension and retraction of a rod of a piston-cylinder. In contrast, some conventional valves may only provide powered extension in one position and rely on a spring to retract the rod. One drawback of relying on a spring for retracting the rod can include limited control of the piston-cylinder during a retraction motion, including force and speed. Thus, embodiments of the invention address these and other drawbacks.

Figure 6:
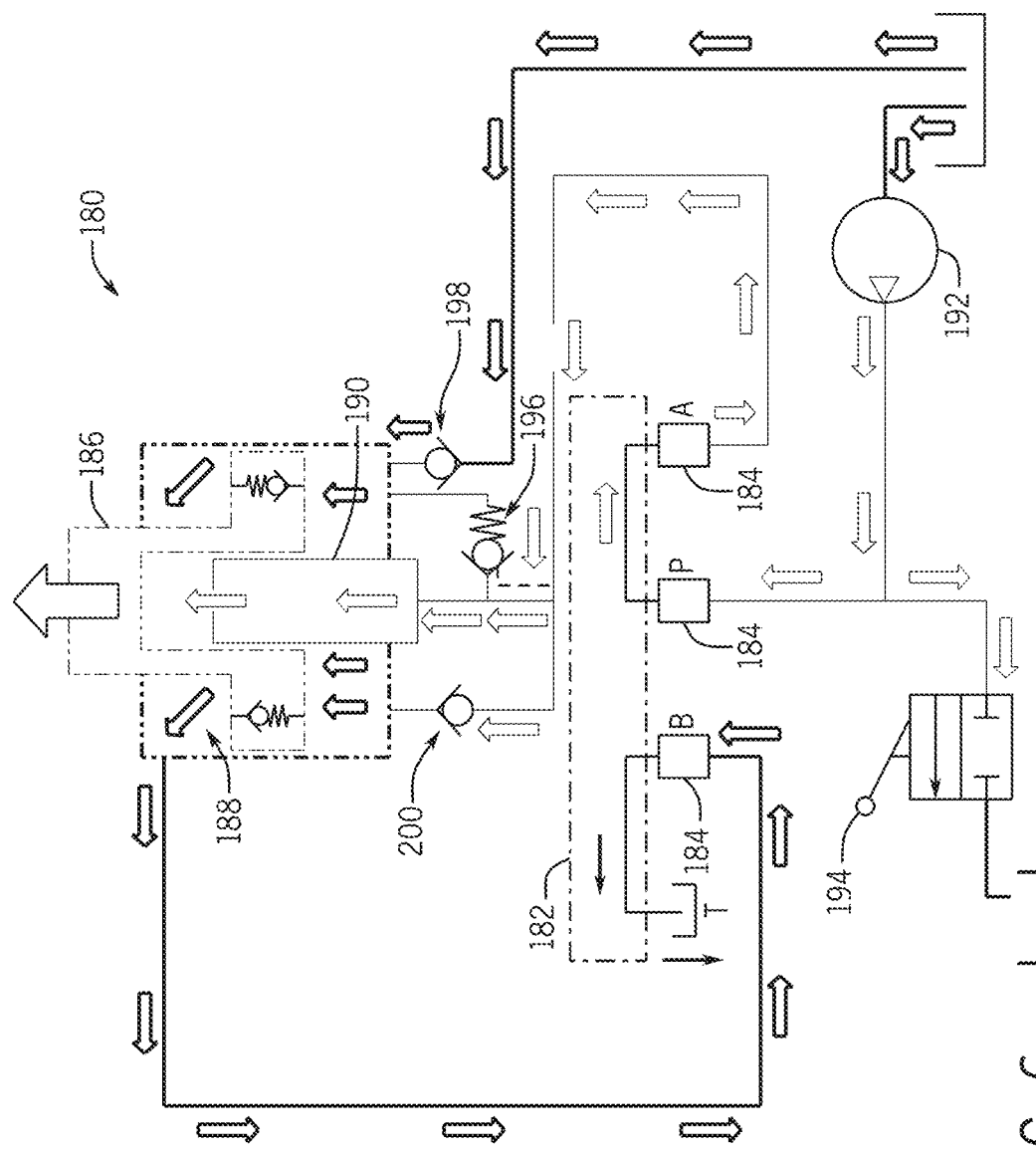
FIG. 6 is a schematic illustration of a hydraulic circuit for a tool including a rotary valve in a rapid-advance ram extension position according to an embodiment of the invention.

FIG. 6 illustrates a schematic system 180 for a hydraulic circuit according to an embodiment of the invention. In some embodiments, the system 180 may be a schematic representation of the hydraulic tool 100 of FIG. 1. In the illustrated embodiment, FIG. 6 represents a hydraulic circuit for a tool including a rotary valve 182 in a rapid-advance ram extension configuration (see, for example, the directional arrows of FIG. 6). However, other configurations of the hydraulic circuit are possible, such as, for example, a high force ram extension configuration, a ram retraction configuration, a system overload protection configuration, and a system decompression configuration.

The rotary valve 182, which in some embodiments may be configured as the rotary valve 108 of the hydraulic tool 100, includes three shear seal discs 184. The three shear seal discs 184 correspond to (and seal) a first port A, a second port B, and a pressure port P of the rotary valve 182. The rotary valve 182 can also include a tank port T. The system 180 also includes a load cylinder 186 and a high force load ram 187. The load ram 187 separates the load cylinder 186 into rod end 188 and a cylinder end 189. An inner cylinder 190 can extend through the cylinder end 189 and can be used for rapid advancement of the load ram 187. As shown in FIG. 6, the first port A is in fluid communication with the inner cylinder 190 and selectively in fluid communication with the cylinder end 189 of the load cylinder 186. The second port B is in fluid communication with the rod end 188 of the load cylinder 186, the pressure port P is in fluid communication with a high pressure pump 192 and fluid reservoir, and the tank port T is in fluid communication with a tank (e.g., reservoir)

The system 180 also includes the high pressure radial piston pump 192 that pumps fluid to and from a fluid reservoir, a manual release valve 194, a sequence valve 196, a pre-fill check valve 198 for the load ram 187 and a check valve 200 for the ram return. Similar to the rotary valve 108 described above with reference to the hydraulic tool 100 and the rotary valve 162 described above with reference to the schematic system 160, the rotary valve 182 is configured as a four-way shear seal valve having two valve positions.

As discussed above, the hydraulic system 180 can be used for rapid advance ram extension (see FIG. 6), high force ram extension (e.g., a higher force than a rapid ram extension), ram retraction, system overload protection at high pressure, low pressure protection at the rod end 188 of the cylinder 186, and system decompression. In particular, during rapid advance ram extension, the pressure port P of the rotary valve 182 can be in fluid communication with a port A. During such rapid advance ram extension, the first port A is in communication with the inner cylinder 190 to move the load ram 187 within the load cylinder 186, and port A is blocked from fluid communication to the cylinder end 189 of the load cylinder 186 via the sequence valve 196.

During a high force ram extension, the sequence valve 196 allows fluid communication between port A and the cylinder end 189 of the load cylinder 186 so that high pressure fluid acts on both the inner cylinder 190 and the load ram 187 from the cylinder end 189 of the load cylinder 186 at the same time. Also during a high force ram extension, the pre-fill check valve 198 prevents fluid from leaving the cylinder end 189 of the load cylinder 186. Additionally, during each of a rapid advance ram extension and a high force ram extension, port A is in fluid communication with the pressure port P.

During a ram retraction, the pressure port A can be in fluid communication with the tank port T to drain hydraulic fluid from the cylinder end 189 of the load cylinder 186 and the inner cylinder 190 so that the load ram 187 can retract. Additionally, during ram retraction, the port B is in fluid communication with the pressure port P so that high pressure fluid can be directed to the rod end 188 of the load cylinder 186 to retract the load ram 187. The pressure port P in fluid communication with port B provides hydraulic cylinder retraction and eliminates the need for a return spring.

During a system overload protection from high pressure, a high pressure relief valve 202 that is pre-set above a system pressure can allow high pressure fluid to flow from the cylinder end 189 to the rod end 188 and out to a tank. Accordingly, during a system overload protection from high pressure, port B (which is connected to the rod end 188) is in fluid communication with the tank port T. The system overload protection may occur during a rapid advance ram extension or a high force ram extension.

During a low pressure protection at the rod end 188 of the load cylinder 186, a low pressure relief valve 204 that is preset at a low pressure (e.g., 1000 psi) can allow fluid to flow from the rod end 188 of to the cylinder end 189 and out to a tank. Accordingly, during a low pressure protection at the rod end 188 of the load cylinder 186, port A (which is connected to the cylinder end 189) is in fluid communication with the tank port T. The low pressure protection may occur during ram retraction.

System decompression can occur when port A is in communication with the pressure port P and the manual release valve 194 relieves pressure from the high pressure piston pump 192 and the associated reservoir. Further, port B is in communication with the tank port T during system decompression.

In general, embodiments of the hydraulic system and the rotary valve described herein allow for double acting cylinder operation (i.e., extension and retraction) while providing pressure protection in both directions.

Thus, embodiments of the disclosed invention can provide a system and method for advancing and retracting a piston of a hydraulic tool via a rotary shear seal valve. The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A hydraulic tool, comprising:
   a hydraulic cylinder;
   a piston within the hydraulic cylinder configured to move between a retracted position and an extended position, the piston including a piston ram and a piston rod that define a ram side and a rod side in the hydraulic cylinder; and
   a rotary valve moveable between a first position and a second position, the first position configured to direct flow at a first variable speed and a first variable force to the ram side of the hydraulic cylinder and the second position configured to direct flow at a second variable speed and a second variable force to the rod side of the hydraulic cylinder,
   the rotary valve including a first pair of teeth and a second pair of teeth.

2. The hydraulic tool of claim 1, wherein the first position corresponds to moving the piston toward the extended position and the second position corresponds to moving the piston toward the retracted position.

3. The hydraulic tool of claim 1, wherein in each of the first position and the second position, hydraulic fluid flows to a fluid reservoir.

4. The hydraulic tool of claim 1, further comprising:
   a drive sprocket coupled to a cam shaft of a motor,
   wherein the drive sprocket is configured to rotate the rotary valve between the first position and the second position.

5. The hydraulic tool of claim 4, wherein the first pair of teeth and the second pair of teeth are configured to engage a pawl of the drive sprocket.

6. The hydraulic tool of claim 5, wherein the pawl can engage a first tooth of the first pair of teeth and then subsequently engage a second tooth of the first pair of teeth.

7. The hydraulic tool of claim 5, wherein the first pair of teeth extend from the rotary valve at a first angle at a first axial position, and wherein the second pair of teeth extend from the rotary valve at a second angle at a second axial position.

8. The hydraulic tool of claim 1, wherein the hydraulic cylinder does not include a return spring.

9. A method of operating a hydraulic tool having a load ram and a rapid advance cylinder within a load cylinder, the load cylinder defining a rod end and a cylinder end, the load ram configured to extend and retract within the load cylinder, the method comprising:
rotating a drive assembly via a motor, the drive assembly having a drive sprocket with a plurality of radially extending pawls; and
rotating a rotary valve from a first position to a second position via one of the radially extending pawls engaging one tooth of a pair of teeth that extend radially from the rotary valve, the pair of teeth in axial alignment along a body of the rotary valve,
the body of the rotary valve defining a first port in fluid communication with the rapid advance cylinder and the cylinder end of the load cylinder, a second port in fluid communication with the rod end of the load cylinder, a pressure port fluidly coupled to a pump and a reservoir, and a tank port fluidly coupled to a tank reservoir.

10. A method of operating a hydraulic tool having a load ram and a rapid advance cylinder within a load cylinder, the load cylinder defining a rod end and a cylinder end, the load ram configured to extend and retract within the load cylinder, the method comprising:
rotating a drive assembly via a motor, the drive assembly having a drive sprocket with a plurality of radially extending pawls; and
rotating a rotary valve from a first position to a second position via one of the radially extending pawls engaging one tooth of a pair of teeth that extend radially from the rotary valve, the pair of teeth in axial alignment along a body of the rotary valve,
the body of the rotary valve defining a first port in fluid communication with the rapid advance cylinder and the cylinder end of the load cylinder, a second port in fluid communication with the rod end of the load cylinder, a pressure port fluidly coupled to a pump and a reservoir, and a tank port fluidly coupled to a tank reservoir; and
rapidly advancing the load ram by directing hydraulic fluid into the rapid advance cylinder and fluidly coupling via rotation of the rotary valve: i) the first port to the pressure port, and ii) the second port to the tank port.

11. The method of claim 10, further comprising:
extending the load ram at a high force by directing hydraulic fluid into the rapid advance cylinder and the cylinder end of the load cylinder, and fluidly coupling via rotation of the rotary valve: i) the first port to the pressure port, and ii) the second port to the tank port.

12. The method of claim 10, further comprising:
retracting the load ram by directing hydraulic into the rod end of the load cylinder and fluidly coupling via rotation of the rotary valve: i) the first port to the tank port, and ii) the second port to the pressure port.

13. The method of claim 10, further comprising:
providing high pressure system overload protection during load ram extension by directing hydraulic fluid from the cylinder end of the load cylinder to the rod end of the load cylinder via a high pressure relief valve and fluidly coupling: i) the first port to the pressure port, and ii) the second port to the tank port.

14. The method of claim 10, further comprising:
providing low pressure system overload protection during load ram retraction by directing hydraulic fluid from the rod end of the load cylinder to the cylinder end of the load cylinder via a low pressure relief valve and fluidly coupling: i) the first port to the tank port, and ii) the second port to the pressure port.

15. The method of claim 10, further comprising:
providing hydraulic decompression of the hydraulic tool by activating a manual release valve that is in fluid communication with the pump and fluidly coupling: i) the first port to the pressure port, and ii) the second port to the tank port.

* * * * *